3,164,727
ERROR DETECTOR FOR REGISTERS
Kenneth C. Heyda, Woburn, Mass., assignor to Automatic Electric Laboratories, Inc., Northlake, Ill., a corporation of Delaware
Filed Sept. 21, 1961, Ser. No. 139,730
4 Claims. (Cl. 307—88.5)

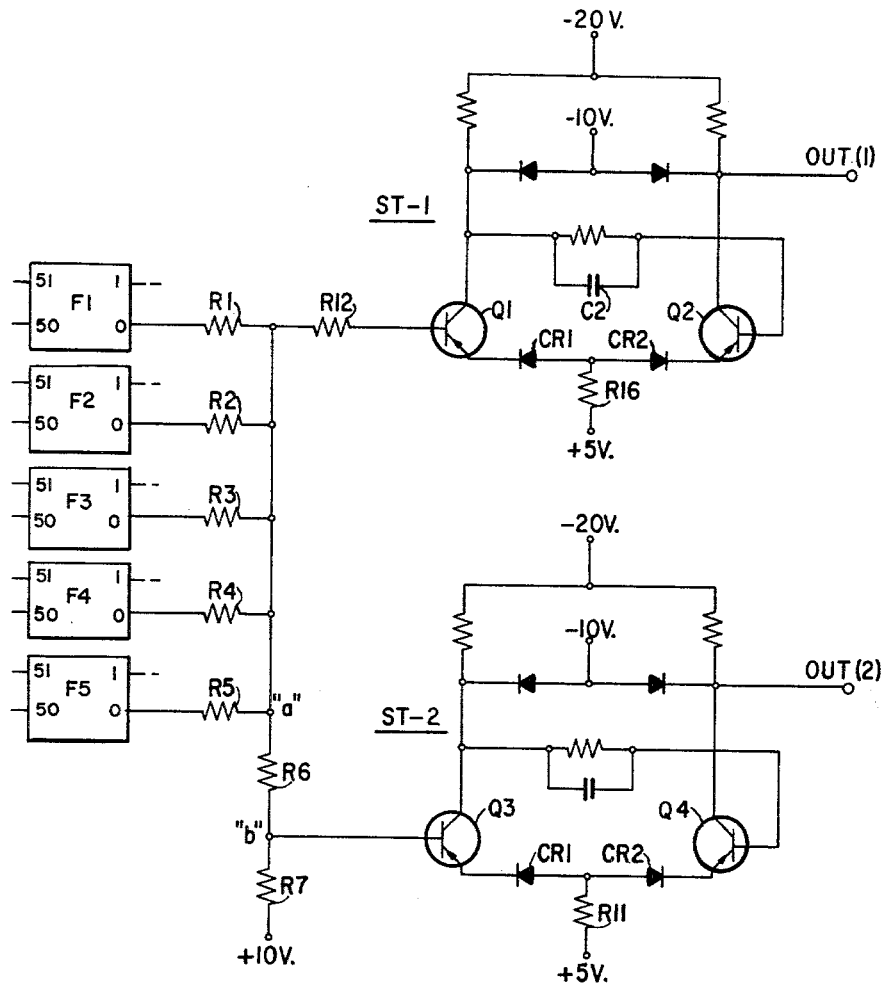

This invention relates to an error detecting arrangement and more particularly to error detectors for flip-flop registers.

In the logical operation of switching circuits, flip-flops are used as temporary storage registers. For the proper operation of some systems in which these registers are used it is necessary to detect any errors which may occur in setting the flip-flops.

These errors may be caused for instance by human failure, noise impulse or slight power failure.

Some of the prior circuits developed to detect errors in these switching circuits merely show when there is an error in the system without telling anything about the actual state of the registers while others require elaborate and expensive networks.

Accordingly, it is an object of this invention to provide a code error detector for registers which is simple and indicates something about the registers state other than the existence of an error.

A feature of this invention involves the use of trigger circuits and precision resistors to indicate when either too many or too few registers have positive or "true" outputs at any time. For this description a register is "true" when its one output is above a reference voltage level and "off" when the one output is at the reference voltage level.

According to the principles of this invention the zero outputs of several registers, flip-flops, are connected through precision resistors to first and second trigger circuits. The trigger circuits are biased in such a way that if a given number of the registers are "true" at one time the first and second trigger circuits will produce output pulses of different polarities while if a number other than the given number of registers are "true" at any time then the first or second trigger circuits will produce outputs of the same polarity. Under a condition where the desired number of registers is true the first trigger circuit will have no output while the second trigger circuit will have an output pulse.

The objects and features of this invention will be more clear and other embodiments will be made obvious by reference to the following description and the drawing comprising a single figure which is a schematic diagram of an embodiment of the invention.

The drawing shows a circuit for detecting code errors in a system having five flip-flop registers F1–F5. The one output of each of these registers is either "true," ground, or "off," −10 volts. The zero output of a register is always in a condition opposite to the one output. The circuit includes precision, five percent, resistors R1 through R5 6.8K ohms, R6 390 ohms, R7 4.7K ohms, R11 and R16 360 ohms and R12 2.2K ohms and Schmidt triggers ST–1 and ST–2. The Schmidt triggers may use for example 2N501 or 2N710 transistors. These trigger circuits are of the standard design except for the series diodes CR1 and CR2 in the emitters to protect the transistors against base to emitter voltage breakdown.

The resistors R1 to R5 are connected to the zero outputs of five flip-flops. The flip-flops have two output points, the zero output and the one output. The output that is at ground is "true" while the output that is at minus 10 volts is "off." The state of these outputs reverses when the state of the register is changed.

The voltage applied to these resistors R1 to R5 is determined by the state of the various flip-flops. The state of the flip-flops are indicated by the condition of the trigger circuits as follows:

If all or any four of the resistor inputs are at ground (indicating "zero" states of the registers) an error condition exists and voltage levels "$a$" and "$b$" will be positive thus producing outputs from both Schmidt triggers ST–1 and ST–2.

When all but two resistor inputs are at ground a correct condition, voltage level "$a$" will be negative causing ST–1 to have zero output and voltage level "$b$" will be positive giving a "one" output from ST–2.

However, when three or more resistor inputs are at minus 10 volts (indicating more than two flip-flops are in the "one" state) an error condition exists. Both "$a$" and "$b$" will be negative, both ST–1 and ST–2 will be in the "zero" state indicating the error.

Though this invention is described with reference to one embodiment it is to be understood that there are many others possible and the invention is not limited to only this embodiment.

What is claimed is:

1. An error detecting arrangement for a set of bistable registers, comprising a network in which each register has an output terminal connected by an individual resistor to a first point, a resistor connecting the first point to a second point, and a resistor connecting the second point to a source of bias potential;
    a first trigger device having an input terminal connected to the first point;
    a second trigger device having an input terminal connected to the second point;
    so constructed and arranged that the voltages at said first and second points cause said trigger devices to be in different states from each other if and only if a given number of the registers are in one given state and the remaining registers are in the opposite state.

2. A combination as claimed in claim 1, wherein said set comprises five registers, said given number is two, said given state is determined by a potential of negative polarity, and said opposite state is determined by a ground potential.

3. In combination, a plurality of registers each having a first state and a second state;
    a first and a second trigger device each having a first state and a second state;
    a plurality of resistors to couple the outputs of said registers to said trigger devices;
    the first trigger device being in the first state and the second trigger device being in the second state only in response to a given number of registers being in the first state, whereby there is provided an arrangement to indicate the existence of error in said plurality of registers when the first trigger device and the second trigger device are in the same state.

4. A combination as claimed in claim 3, wherein said plurality is five, said first state is determined by a potential of negative polarity, said second state is determined by a ground potential, and said given number is two.

References Cited in the file of this patent
UNITED STATES PATENTS
2,858,429    Heywood _____ Oct. 28, 1959
OTHER REFERENCES
Kellett: "The Elliott Sheffer Stroke Static Switching System," Electronic Engineering, September 1960, pages 534–539.